United States Patent
Nakauchi

[19]

[11] Patent Number: 6,119,683
[45] Date of Patent: Sep. 19, 2000

[54] SOLAR HEAT COLLECTING APPARATUS

[75] Inventor: Shunsaku Nakauchi, Mitaka, Japan

[73] Assignee: Kokusai Gijutsu Kaihatsu Kabushiki Kaisha, Tokyo, Japan

[21] Appl. No.: 09/179,786

[22] Filed: Oct. 27, 1998

[51] Int. Cl.⁷ ....................................................... F24J 2/50
[52] U.S. Cl. ........................ 126/652; 126/656; 126/634; 126/648; 126/661; 126/906
[58] Field of Search ................... 126/652, 651, 126/634, 646, 648, 649, 657, 658, 585, 653, 654, 660, 661, 662, 656, 906, 650

[56] References Cited

U.S. PATENT DOCUMENTS

| | | | |
|---|---|---|---|
| 3,880,535 | 4/1975 | Durham et al. | 248/205.3 |
| 3,916,871 | 11/1975 | Estes et al. | 126/906 |
| 3,986,491 | 10/1976 | O'Hanlon | 126/904 |
| 4,073,282 | 2/1978 | Schriefer, Jr. | 126/648 |
| 4,080,957 | 3/1978 | Bennett | 126/648 |
| 4,138,991 | 2/1979 | Lorenz | 126/709 |
| 4,172,547 | 10/1979 | DelGrande | 228/121 |
| 4,183,351 | 1/1980 | Hinotani et al. | 126/652 |
| 4,186,725 | 2/1980 | Schwartz | 126/652 |
| 4,193,786 | 3/1980 | Leon | 432/3 |
| 4,201,190 | 5/1980 | Bowen | 126/710 |
| 4,214,574 | 7/1980 | O'Hanlon | 126/648 |
| 4,233,962 | 11/1980 | Neny | 126/651 |
| 4,270,524 | 6/1981 | Bachli | 126/661 |
| 4,278,070 | 7/1981 | Bowen | 126/710 |
| 4,284,070 | 8/1981 | Wilke | 126/904 |
| 4,291,684 | 9/1981 | Werner et al. | 126/904 |
| 4,309,984 | 1/1982 | Dorbeck | 126/704 |
| 4,326,503 | 4/1982 | Geier et al. | 126/710 |
| 4,341,200 | 7/1982 | Bowen | 126/904 |
| 4,361,134 | 11/1982 | Bowen | 126/904 |
| 4,384,750 | 5/1983 | Hager | 248/632 |
| 4,401,167 | 8/1983 | Sekizawa et al. | 248/632 |
| 4,471,764 | 9/1984 | Calvert et al. | 126/904 |
| 4,535,756 | 8/1985 | Rinehart et al. | 126/709 |
| 4,708,124 | 11/1987 | Dorbeck | 126/654 |
| 4,716,882 | 1/1988 | Ishida | 126/651 |
| 4,803,972 | 2/1989 | Janson | 126/904 |
| 4,911,145 | 3/1990 | Ohashi | 126/584 |
| 4,946,090 | 8/1990 | Hepburn | 228/121 |
| 4,949,704 | 8/1990 | Pfluger | 126/648 |
| 4,987,679 | 1/1991 | Rau | 248/632 |
| 4,989,822 | 2/1991 | Fannon | 248/632 |
| 4,993,403 | 2/1991 | Downs et al. | 126/652 |
| 5,558,310 | 9/1996 | Furuie et al. | 248/632 |
| 5,601,075 | 2/1997 | Lai | 126/585 |

FOREIGN PATENT DOCUMENTS

| | | | |
|---|---|---|---|
| 2712153 | 9/1978 | Germany | 126/653 |
| 2737784 | 8/1979 | Germany | 126/653 |

*Primary Examiner*—Ira S. Lazarus
*Assistant Examiner*—Josiah C. Cocks
*Attorney, Agent, or Firm*—Samuels, Gauthier & Stevens, LLP

[57] ABSTRACT

A solar heat collecting apparatus wherein a heat-absorbing plate for absorbing the solar radiation is installed in a vacuum vessel, the solar heat accumulated in the heat-absorbing plate is transmitted to a working medium in a pipe connected to the heat-absorbing plate, an upper surface layer for passing the solar radiation irradiated on the heat-absorbing plate therethrough and reflecting the infrared radiation emerging from the heat-absorbing plate is formed on the upper surface of the heat-absorbing plate, a lower surface layer for reflecting the infrared radiation emerging from the heat-absorbing plate is formed on the lower surface of the heat-absorbing plate, a space-diving film is formed between the lower surface of the heat-absorbing plate and the bottom surface of the vacuum vessel, a reflection layer is formed on the bottom surface of the vacuum vessel, a film for passing the solar radiation and reflecting the infrared radiation is provided between the upper surface of the heat-absorbing plate and the upper wall of the vacuum vessel, and the upper wall of the vacuum vessel is formed of a plurality of transparent curved segments.

12 Claims, 9 Drawing Sheets

(A)   (B)

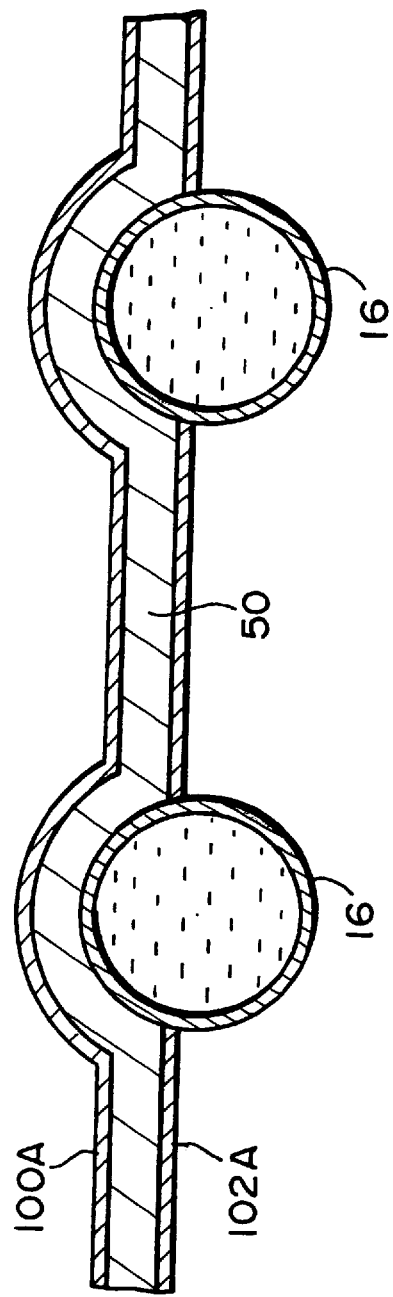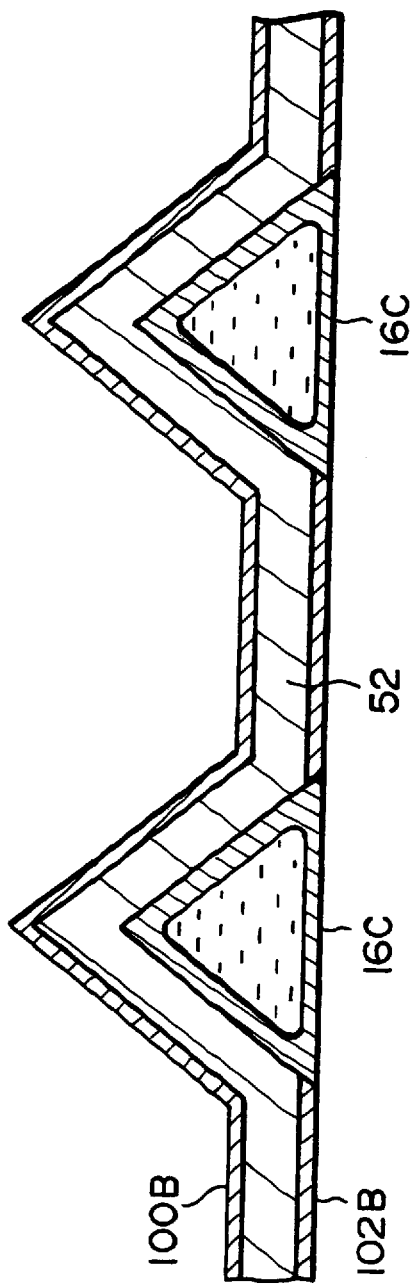

SOLAR HEAT COLLECTING APPARATUS

BACKGROUND OF THE INVENTION

1. Field of the Invention

The present invention relates to a solar heat collecting apparatus, and more particularly to an apparatus for collecting solar heat to produce a high-temperature medium.

2. Description of the Related Art

Solar heat collecting apparatuses are widely used as, for example, water heaters. In an ordinary solar heat collecting apparatus, a heat-absorbing member absorbs solar radiant energy and produces heat. An example heat-absorbing member would be a flat heat-absorbing plate. Commonly a pipe for conducting a medium is attached to such heat-absorbing plates, and the collected solar heat is then transmitted to the medium such as water in the pipe. In this way, high-temperature water can be produced.

However, in conventional apparatuses provided with such a heat-absorbing plate, heat is also transferred from the heat-absorbing plate to the ambient air by thermal conduction. As the air flows convectively, a great heat loss can occur through thermal conduction. A large amount of infrared radiation is emitted from the heat-absorbing plate to the surroundings, which results in additional considerable heat loss. Because of such heat losses, such as thermal conduction and heat radiation, in conventional apparatuses, it has been difficult to obtain water at higher than about 100° C.

Heat absorption and heat loss of the heat-absorbing plate will be discussed in more detail.

The heat loss by infrared radiation from the heat-absorbing plate becomes greater as the temperature of the heat-absorbing plate rises. For a typical 1 m² heat-absorbing plate with an emissivity of 0.9 at 150° C. and a gray radiator with an emissivity of 0.9 at 30° C. provided surrounding the heat-absorbing plate, the energy radiated from the heat-absorbing plate to the gray radiator amounts to as much as 1 kW/m² on only one surface of the heat-absorbing plate, and therefore a total radiation loss from both surfaces of the above-mentioned heat-absorbing plate is no less than 2 kW/m². On the other hand, the solar radiant energy absorbed by the above-mentioned heat-absorbing plate can be estimated at about 800 kW/m². With all of these figures taken into account, it is not possible to produce water with a temperature more than about 80–90° C.

As is obvious from the foregoing, in such conventional apparatuses, it has been difficult to decrease heat loss by effectively suppressing the heat radiation and thermal conduction from the heat-absorbing plate. It is desired that the utilization ratio of solar heat should be improved.

SUMMARY OF THE INVENTION

An object of the present invention is to reduce heat loss by decreasing both the heat radiation and thermal conduction from the heat-absorbing plate in the solar heat collection apparatus.

Another object of the present invention is to produce a high-temperature medium (preferably, 100–200° C.) by solar heat.

To achieve the above objects, the solar heat collecting apparatus according to the present invention comprises:

a vacuum vessel;

a heat-absorbing member for absorbing solar heat, arranged within the vacuum vessel so that it is separated from the walls of the vacuum vessel and so that its upper surface may be irradiated by solar radiation;

a medium transport pipe, connected to the heat-absorbing member, for transporting a medium to which the solar heat is transmitted from the heat-absorbing member; and a lower surface layer, formed on the underside of the heat-absorbing member, for reflecting infrared radiation which would emerge from the heat-absorbing member.

According to the above-mentioned structure, first, because the heat-absorbing member (a heat-absorbing plate, for example) is located within a vacuum vessel, thermal conduction from the heat-absorbing member to the ambience (air, for example) is suppressed, so that heat loss by thermal conduction is reduced notably. Second, the lower surface layer is formed on the lower surface of the heat-absorbing member, the infrared radiation which would be emitted from the lower surface of the heat-absorbing member is reflected by the lower surface layer and confined in the heat-absorbing member, so that heat loss by infrared radiation is reduced. Therefore, both thermal conduction and heat radiation are decreased and thus the utilization ratio of the solar heat can be improved. Consequently, the temperature of the medium can be made higher than in the conventional apparatus.

Preferably, an upper surface layer, which permits the solar radiation to pass through and reflects the infrared radiation from the heat-absorbing member, is formed on the upper surface of the heat-absorbing member.

This upper surface layer serves as a selective transmission layer (or a selective absorption layer). In other words, the solar radiation passes through the upper surface layer (or the solar radiation is absorbed by the upper surface layer), but the emission of the infrared radiation from the heat-absorbing member is blocked effectively by the upper surface layer. When the infrared radiation from the upper surface of the heat-absorbing member is suppressed in addition to the suppression of the infrared radiation from the lower surface of the heat-absorbing member, the heat loss by heat radiation can be further reduced by a factor of two.

It may also be preferable for at least one insulating film (preferably, a metal film) to be formed between the lower surface of the heat-absorbing member and the bottom surface of the vacuum vessel in such a way that the insulating film is parallel with those surfaces. When an insulating film (preferably, a metal film) is provided in a direction at right angles with the direction of the flow of heat, the heat can be effectively insulated in terms of both thermal conduction and heat radiation.

It may further be preferable that a bottom surface layer, which reflects the infrared radiation emerging from the lower surface of the heat-absorbing member, be formed on the bottom surface of the vacuum vessel. According to this structure, some infrared radiation that have passed through the lower surface layer are reflected back to the heat-absorbing member by the bottom surface layer.

It may also be preferable for a selective transmission film, which permits the solar radiation to pass and reflects the infrared radiation emerging from the heat-absorbing member, to be formed between the upper surface of the heat-absorbing member and the upper wall of the vacuum vessel. This selective transmission film acts as a supplementary means of or on behalf of the above-mentioned selective transmission layer.

A regulating member may also be provided to guide to the heat-absorbing member the infrared radiation moving around the end portion of the heat-absorbing member from the lower surface to the upper surface of the heat-absorbing member.

The gap between the regulating member and heat-absorbing member is made as small as possible in order to reduce the heat loss from infrared (so called "cavity radiation").

BRIEF DESCRIPTION OF THE DRAWINGS

FIG. 9 is a sectional view showing another example of the heat-absorbing plate;

FIG. 10 is a sectional view showing yet another example of the heat-absorbing plate.

DESCRIPTION OF THE PREFERRED EMBODIMENTS

Figure 1:
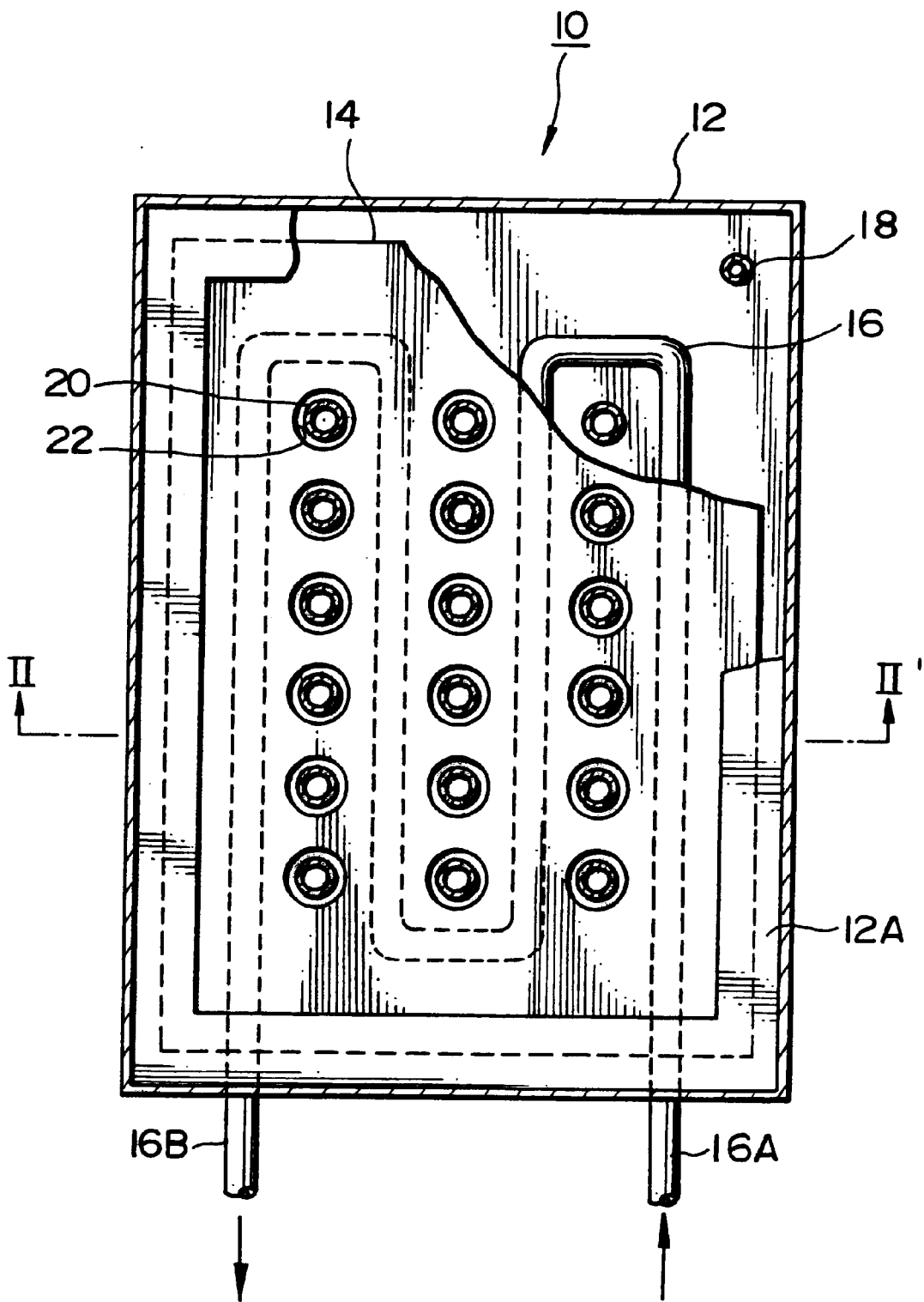
FIG. 1 is a top view of the solar heat collecting apparatus according to an embodiment of the present invention.
Figure 2:
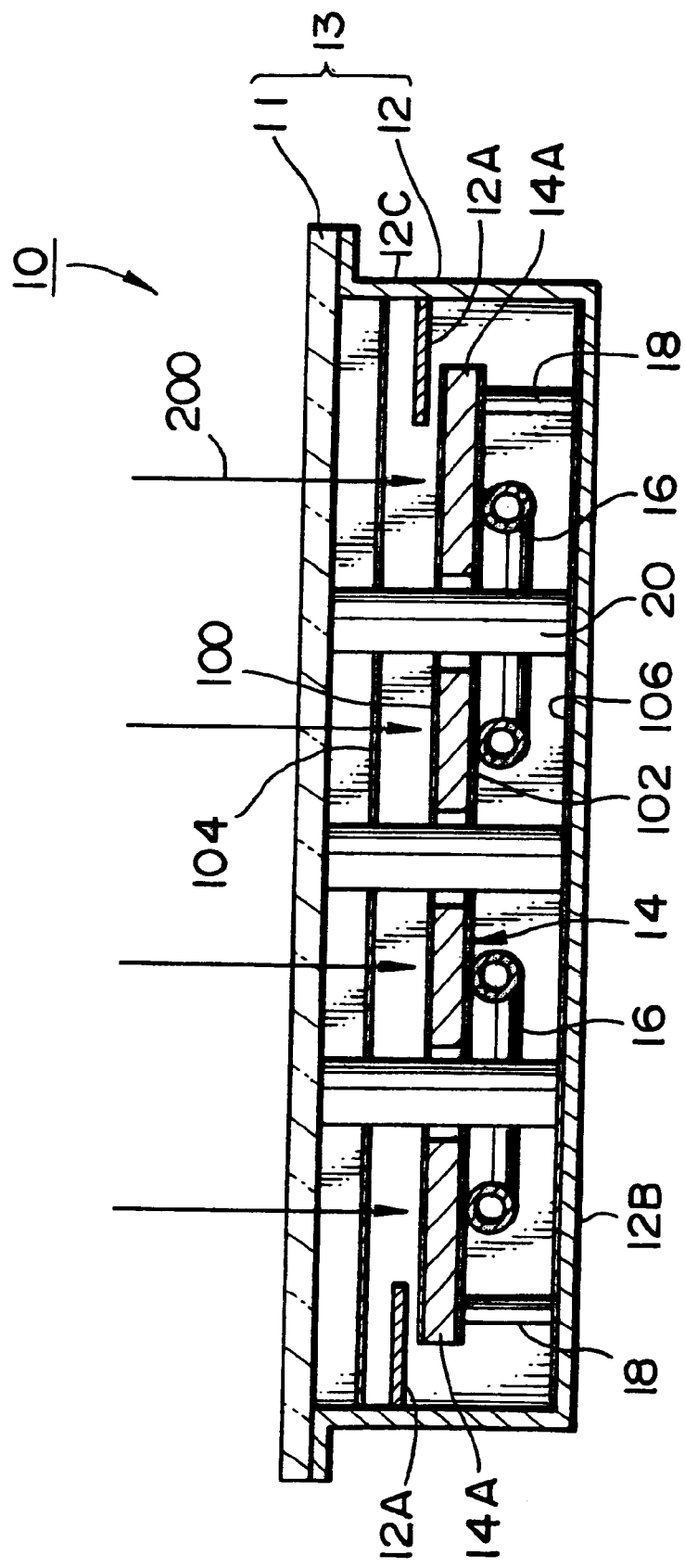
FIG. 2 is a sectional view of the solar heat collecting apparatus according to the embodiment of the present invention.

FIGS. 1 and 2 show a preferred embodiment of the solar heat connecting apparatus according to the present invention. FIG. 1 is a plan view of the apparatus when a window member 11 serving as an upper wall is removed, and FIG. 2 is a sectional view taken along line II of FIG. 1.

In FIGS. 1 and 2, a solar heat connecting apparatus 10 comprises a vacuum vessel 13 generally shaped like a flat plate, a heat-collecting plate 14 for absorbing solar heat mounted in the vacuum vessel, and a pipe 16 tightly attached to the lower surface of the heat absorbing plate. The vacuum vessel 13, as shown in FIG. 2, includes a body 12 made of, for example, a metal and a window member 11 made of a transparent glass or plastic. The window member 11 is provided generally in parallel with a bottom wall 12B of the body 12. A heat-absorbing plate 14 is also mounted in parallel with the bottom wall 12B of the body 12.

The heat-absorbing plate 14 is formed of a material that stores heat of converted solar irradiation to later provide that heat (in other words, formed of a solar heat absorbing material, such as a flat metal plate). The heat-absorbing plate 14 is supported at four corners by support members 18. For the support members 18, it is desirable to use a material having heat-resisting and heat-insulating properties. By supporting the heat-absorbing plate 14 only at the four corners, heat loss by thermal conduction can be reduced. The heat loss can be further reduced by using pipes for support member 18.

The window member 11 is assembled from a plurality of segments described below. An upper periphery of the body 12 and a plurality of pipe columns 20 support the window member 11. In the window member 11 are formed a plurality of holes 22 which allow the pipe columns 20 to pass through without contacting the walls of those holes. Because the pipe columns 20 are not in contact with the heat-absorbing plate 14, the heat is prevented from being lost by thermal conduction from the columns 20, so that a plastic with a relatively low melting point can be used for the pipe columns 20.

The body 12 is made up of a bottom wall 12B and four side walls 12C. A regulating member 12A is provided along the inside surface of the side walls 12C. The regulating member 12A covers the gap between the peripheral portion 14A of the heat-absorbing plate 14 and the side walls 12C. The infrared energy radiating from the bottom to the top of heat-absorbing plate 14, through the gap between the regulating member 12A and the peripheral portion 14A, causes considerable heat loss. To reduce this heat loss, the gap is made as small as possible, preferably about 1 mm. Furthermore, the regulating member 12A extends to cover the peripheral portion 14A. However, as shown in FIG. 1, the greater part of the heat-absorbing plate 14 is exposed when viewed from above. The exposed portion of the heat-absorbing plate 14 receives the solar radiation. The regulating member 12A reflects and guides the infrared radiation moving from the underside to the upper side of the heat-absorbing plate 14 to let the infrared radiation travel toward the heat-absorbing plate 14.

The pipe 16, as shown in FIG. 1, is in a shape having bends located at a plurality of points on the lower surface of the heat-absorbing plate 14 from an inlet 16A to an outlet 16B as shown in FIG. 1. This shape increases the area of contact between the pipe 16 and the heat-absorbing plate 14. Methods for further increasing the contact area will be described later with reference to FIGS. 9 and 10.

A heat transport medium such as water flows in the pipe 16. The heat is transmitted through the pipe 16 from the heat-absorbing plate 14 to the water. By this arrangement, the water temperature can be raised gradually as the water flows through the route of the pipe 16. By the apparatus according to this embodiment, the heat loss can be reduced greatly by a reflection layer, for example, which will be described below in great detail. Consequently, the temperature of the heat-absorbing plate 14 can be raised to 150–200° C., for example. In this case, the temperature of the pipe 16 is heated to a similar temperature. The water in the pipe 16, too, is heated to a very high temperature. Therefore, the pipe 16 is subjected to a steam pressure of several tens of atmospheres. The pipe 16 is made of a material which can withstand such a high pressure, such as a metal.

In the present embodiment, a selective transmission layer (or absorbing film) 100 as the upper surface layer is formed at the upper surface (sunshine receiving surface) of the heat-absorbing plate 14. This selective transmission layer 100 is a thin film that transmits (or absorbs) the solar radiation (visible radiation), but reflects infrared radiation emerging from the heat-absorbing plate 14. A reflection layer (a reflection film) 102 as the lower surface layer is formed at the lower surface (non-light-receiving surface) of the heat-absorbing plate 14. The reflection layer 102 confines the infrared radiation from the heat-absorbing plate by reflecting them. The selective transmission layer 100 has a wavelength dependency, but the reflection layer 102 may have a property that reflects all rays. The method of manufacturing this reflection layer 102 will be described in further detail below.

In the present embodiment, a selective transmission film 104 is provided between the window member 11 and the selective transmission layer 100 of the heat-absorbing plate 14. The selective transmission film 104 has the same property as the selective transmission layer 100, in other words, it transmits the solar radiation and reflects the infrared radiation. A reflection layer 106 is formed on the bottom wall 12B facing the lower surface of the heat-absorbing plate 14. The reflection layer 106 has the same property as the above-mentioned reflection layer 102, more specifically, the reflection layer 106 reflects the infrared radiation. Incidentally, a reflection layer may be formed on the internal surfaces of the side walls 12C.

In the present embodiment, two selective transmission means are formed on the upper surface of the heat-absorbing plate 14, and two reflection means are provided on the lower surface of the heat-absorbing plate 14. Therefore, the radiation of infrared radiation can be suppressed and heat loss can be reduced effectively. Because the infrared radiation moving around the peripheral portion 14A can be utilized effectively by the use of the regulating plate 12A, and also in this respect, the heat loss can be reduced.

Preferably, the height of the vacuum vessel 13 is 100 mm, for example. The body 12 is made of a metal, for example, and its thickness is 1 mm, for example. The window member 11 has a thickness of 3 mm, for example. The window member 11 has a total area of 1–2 m$^2$, for example. The heat-absorbing plate 14 has a thickness of 2 mm, for example. The pressure of the vacuum vessel 13 is 0.05 Pa, for example. The wall thickness of the pipe 16 is 0.3–0.4 mm, for example. Needless to say, those values may be varied according to the conditions, such as the use and the installation site of the apparatus.

Figure 3:
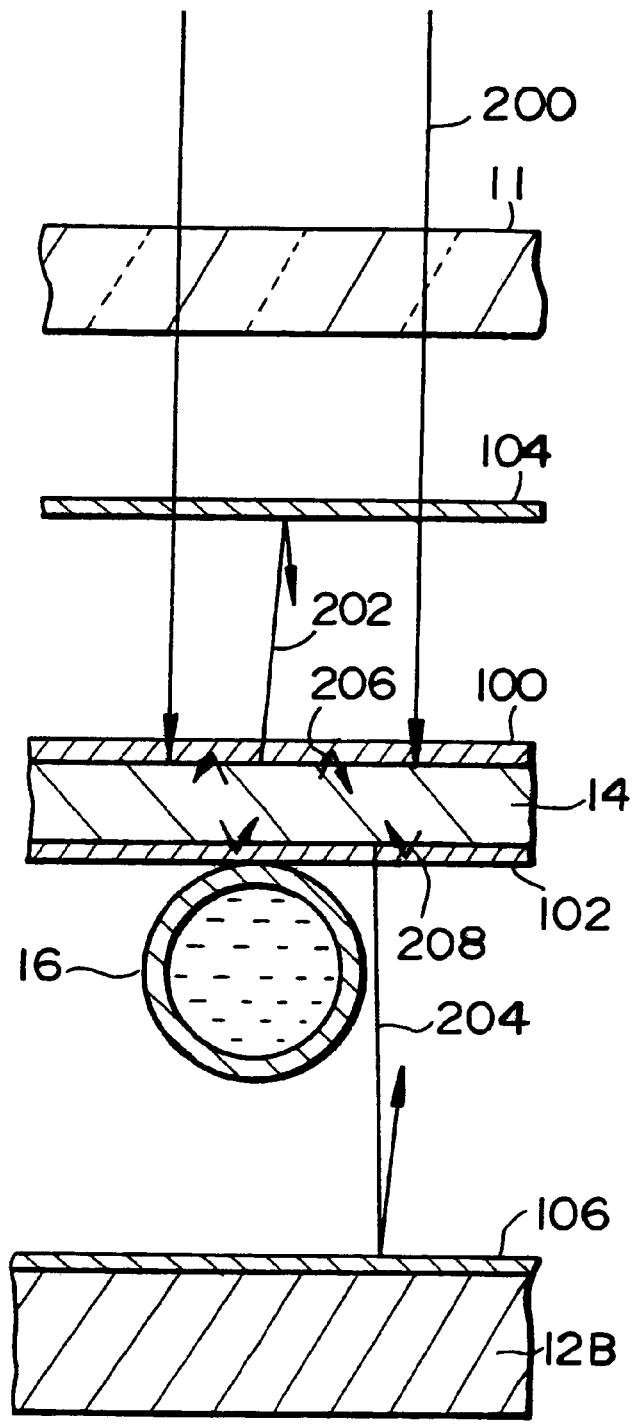
FIG. 3 is a diagram showing the absorption of the solar radiation and the emission of the infrared radiation.

FIG. 3 shows the functions of the selective transmission layer 100, the reflection layer 102, the selective transmission film 104, and the reflection layer 106. The solar radiation 200 enters the vacuum vessel through the window member 11 and passes through the selective transmission film 104 and the selective transmission layer 100 before being absorbed by the heat-absorbing plate 14. The selective transmission layer 100 may have a function of absorbing the solar heat. By the absorption of the solar radiation, the heat-absorbing plate 14 emits heat, radiating infrared radiation 206 and 208. However, the infrared radiation 206 and 208 is effectively reflected by the selective transmission layer 100 and the reflection layer 102 and therefore are confined within the heat-absorbing plate 14. Even though infrared radiation 202 and 204 is released as part of the confined infrared radiation, the infrared radiation 202 and 204 is reflected by the selective transmission film 104 and the reflection film 106, and sent back to the heat-absorbing plate 14.

As has been described, a first feature of the present embodiment is that by installing the heat-absorbing plate 14 in a vacuum, the heat loss by thermal conduction can be decreased markedly. Also, because the infrared radiation radiated from the heat-absorbing plate 14 can be confined, the heat loss by thermal radiation can be decreased notably. Owing to those two measures, the efficiency of heat collection can be raised remarkably compared with that of conventional apparatuses. Therefore, according to the present embodiment, the heat-absorbing plate 14 can be raised to higher temperatures than in the conventional apparatus.

A method of processing the lower surface of the heat-absorbing plate 14 will next be described.

As is clear from the foregoing, the heat-absorbing plate 14 is preferably formed as a metal plate. If the lower surface is polished to improve the reflectivity, the reflection efficiency of the infrared radiation can be raised. In other words, the amount of infrared radiation from the heat-absorbing plate 14 can be reduced. Therefore, the reflection layer 102 may be formed by such a polishing process.

A possible method to improve the reflection efficiency of the infrared radiation is to vapor-deposit a metal, such as gold, silver, copper, or aluminum, to the lower surface of the heat-absorbing plate 14. A metal-vapor-deposited film formed in a high vacuum has very high reflection efficiency, for example, it exhibits a reflectivity of about 98% to infrared radiation with wavelengths of longer than 1 μm. Among the above-mentioned metals, silver shows a reflectivity of 99%. Instead of vapor deposition, sputtering, chemical plating or the like may also be used.

When it is difficult to perform vacuum deposition directly to the heat-absorbing plate 14, a method such as forming a metal layer on a plastic film by vapor deposition and attaching the composite film thus formed to the lower surface of the heat-absorbing plate 14 may be used. Such a composite film can be formed easily in a vacuum vessel while the film is wound, which is advantageous in terms of production cost. For such a film, in view of the ultimate temperature (200° C. for example) of the heat-absorbing plate 14, it is preferable to use a heat-resistant film, such as polyimide film, or to use a metal foil such as aluminum foil. The above-mentioned reflection layer 106, too, is preferably formed by metal vapor deposition or by the attachment of a composite film as described above.

Figure 4:
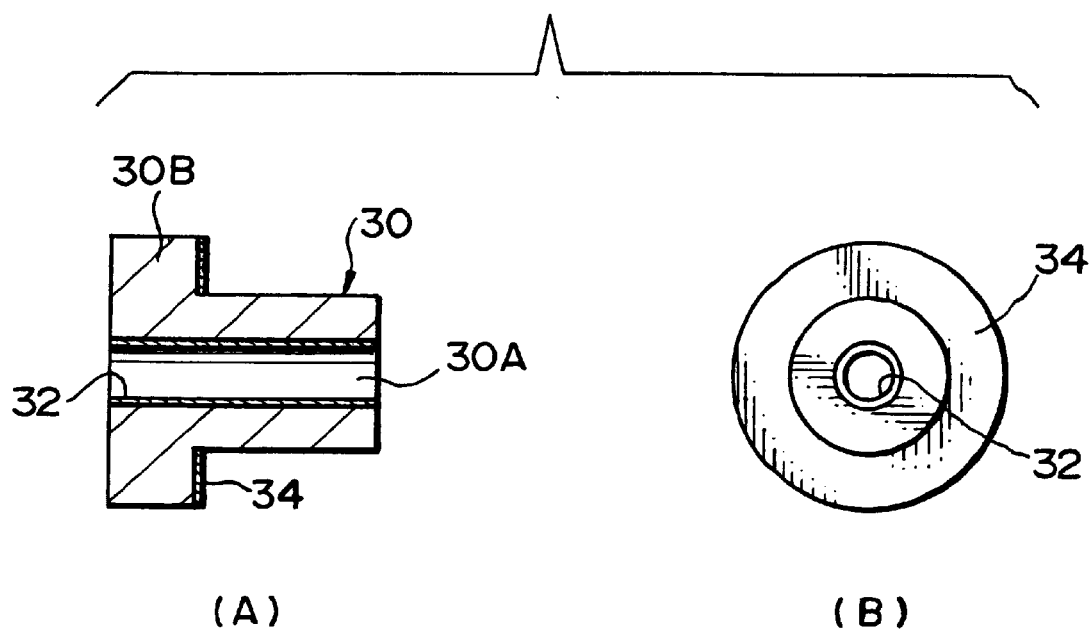
FIG. 4 is a diagram showing the shape of the bushing.
Figure 5:
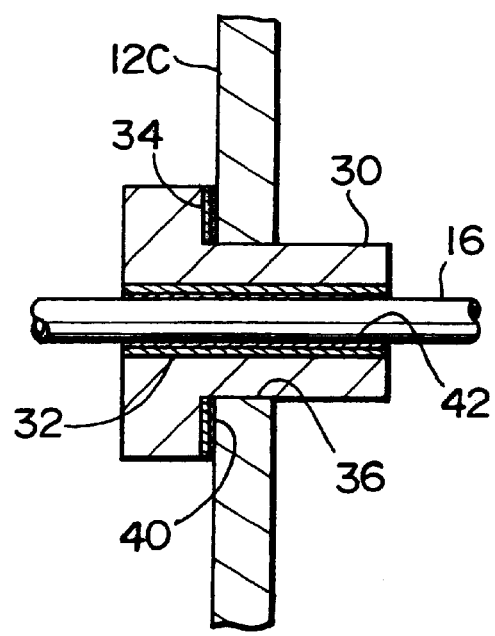
FIG. 5 is a diagram showing the bushing mounted on the vessel.

FIG. 4 shows an example of a bushing 30 mounted to the vacuum vessel. The bushing 30 includes a main body and an annular projection 30B, and a hole 30A passes through the whole bushing 30. A metal film 32 is formed on the internal surface of the hole 30A, and a metal film 34 is formed on the surface of the projection 30B which contacts the body. As shown in FIG. 5, the bushing 30 is fitted into a hole 36 formed in the side wall 12C, and also a pipe 16 is inserted into the hole 30A. The metal film 34 and the external surface of the body 12C are hermetically connected and also the pipe 16 and the metal film 32 of the hole 30A are hermetically connected by metal solder 40, 42, for example. By hermetic connection, the airtightness of the vacuum vessel 13 can be maintained.

Figure 6:
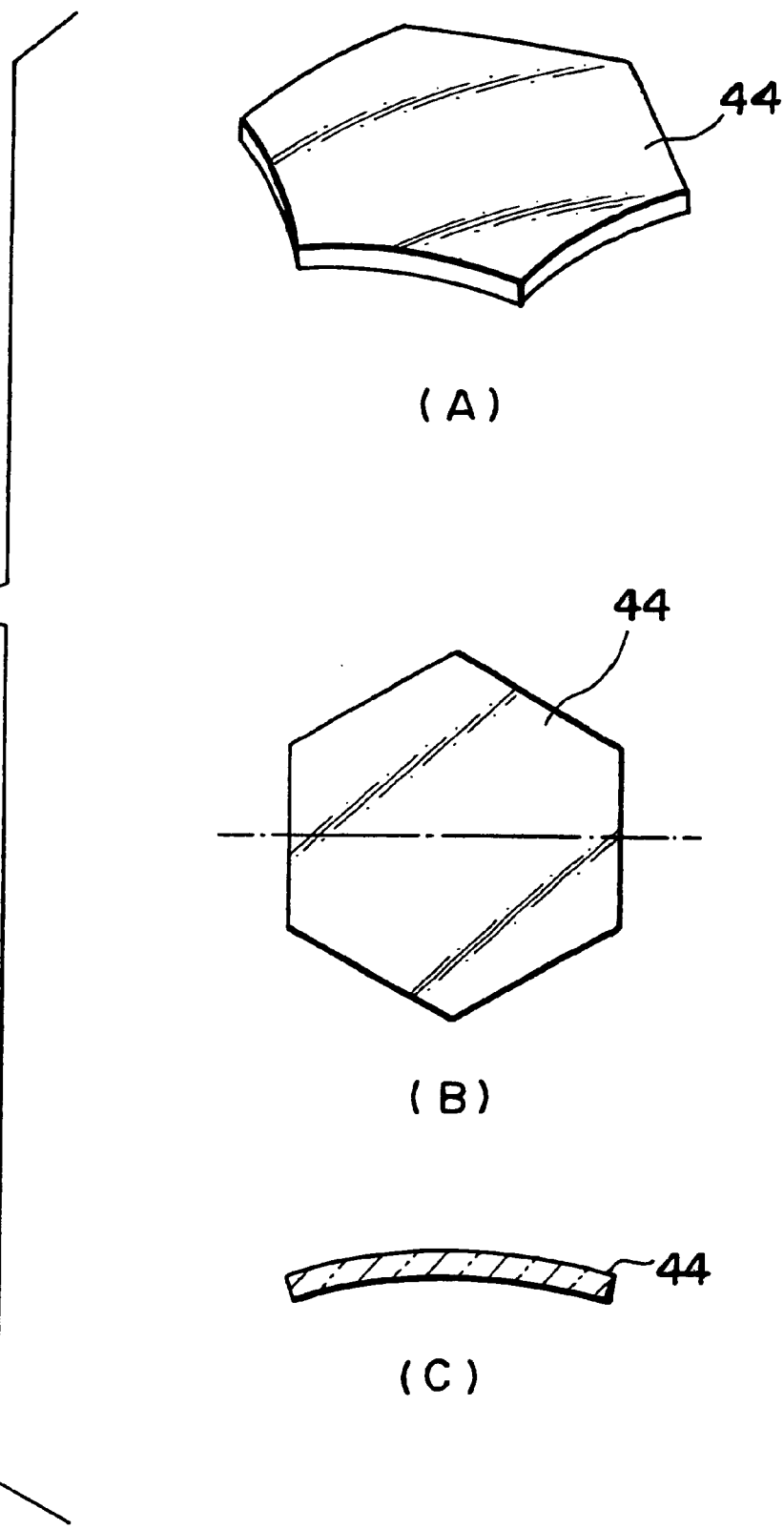
FIG. 6 is a diagram showing a transparent segment as a component part of the upper wall.
Figure 7:
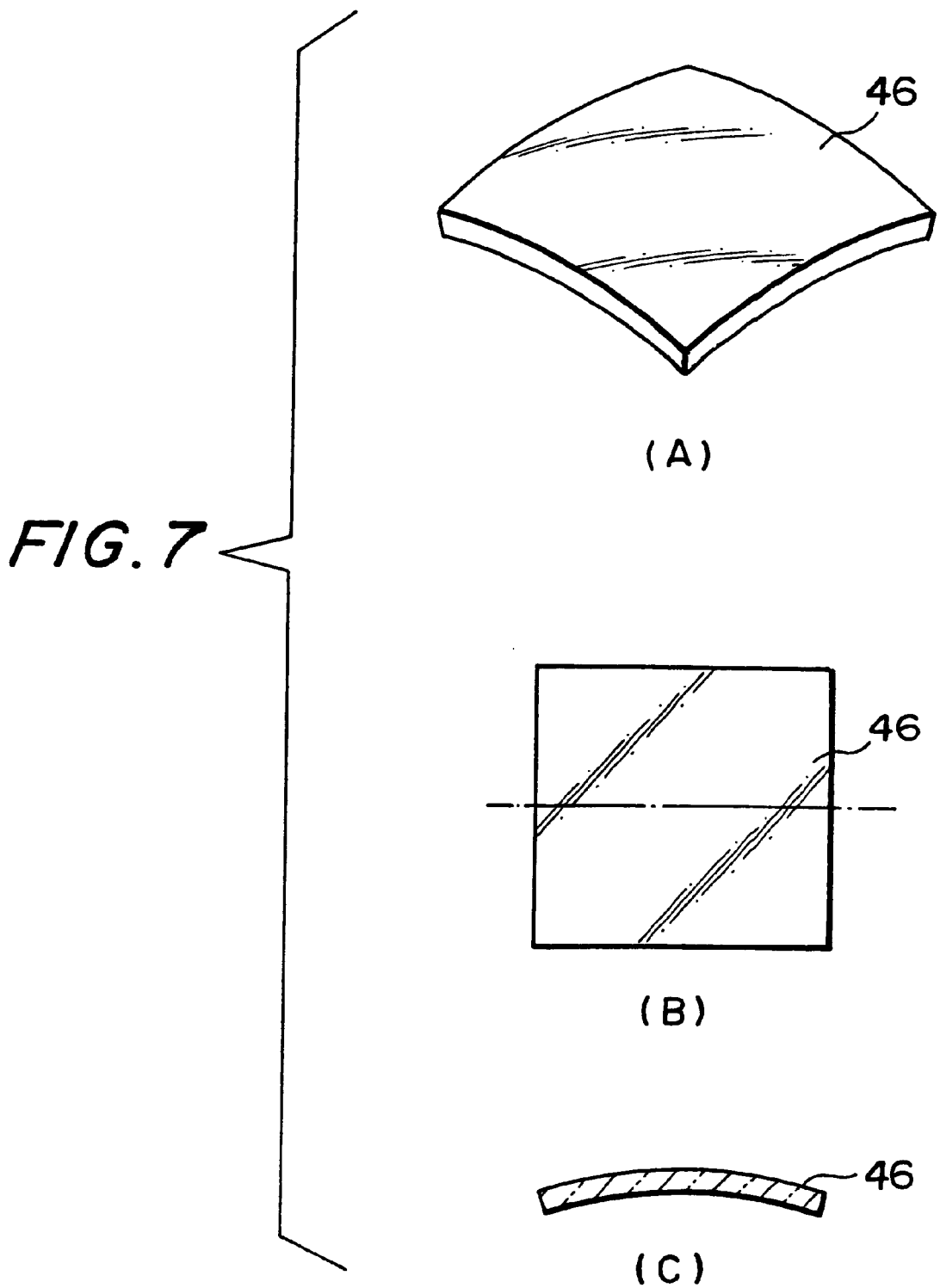
FIG. 7 is a diagram showing another example of a transparent segment as a component part of the upper wall.

The window member 11 will next be described with reference to FIGS. 6 and 7. Since the vacuum vessel 13 is evacuated to produce a vacuum, when the window member 11 has an area of 1–2 m$^2$, the window member 11 is put under a total atmospheric pressure of as much as 10–20 tons. For this reason, when the window member is formed by a single glass pane, for example, the thickness inevitably becomes large. Problems then result such as that the size and cost of the apparatus increases, and solar radiation attenuates during the passage through the glass. Therefore, in the present invention, the window member 11 is formed as an assembly of a number of curved segments 44 and 46. Also, the window member 11 is supported by a plurality of columns 20. FIG. 6 shows hexagonal curved segments 44. FIG. 7 shows square curved segments 46. In FIGS. 6 and 7, (A) indicates a perspective view of the segment, (B) indicates a top view of the segment, and (C) indicates a sectional view of the segment. Those segments are joined together, and the window member 11 is supported by the plurality of columns 20 at the joining borders or at other portions of the window member 11. Because of the window composition by a plurality of curved segments and the use of a plurality of columns 20, even if the window thickness is decreased, the window member 11 has a strength sufficient to withstand the atmospheric pressure.

Figure 8:
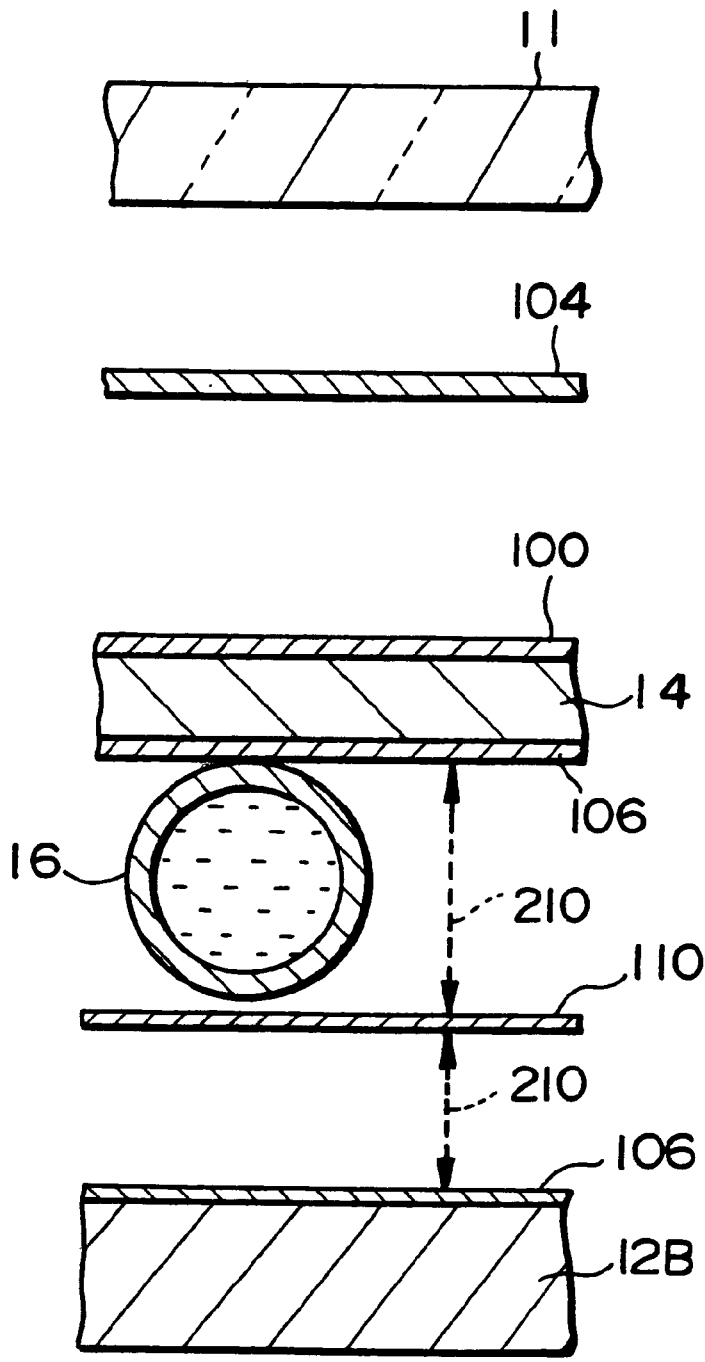
FIG. 8 is a diagram showing the absorption of the solar radiation and the emission of the infrared radiation in another embodiment.

FIG. 8 shows a structure of another preferred embodiment of the present invention. In this embodiment, an insulating film 110 is added to the structure shown in FIGS. 1 and 2. More specifically, the insulating film 110 made of a metal film, for example, is provided between and in parallel with the heat-absorbing plate 14 and the bottom wall 12B. This insulating film 110 is charged with suppressing both heat radiation and thermal conduction. To obtain greater effects, desirably, a plurality of insulating films are installed a certain distance apart from each other. In this case, in compliance with well-known superinsulation method, the distances among the component members are set preferably at less than the mean free path of gas molecules.

FIGS. 9 and 10 illustrate yet another preferred embodiment of the present invention. In the embodiment shown in FIG. 9, those portions of the heat-absorbing plate 50 which are connected with the pipe are formed in a semi-cylindrical shape. In other words, the pipe is connected to the semi-cylindrical portions of the heat-absorbing plate 50. Also in this embodiment, the heat-absorbing plate 50 has formed thereon a selective transmission layer 100A and a reflection layer 102A as in the embodiment shown in FIGS. 1 and 2. In the embodiment shown in FIG. 10, those portions of the heat-absorbing plate 52 which are connected with the pipe are formed with a triangular cross section. In other words, a pipe 16C with a triangular cross section is connected to the triangular portions of the heat-absorbing plate 52. With this configuration as well, on the heat-absorbing plate 52 is formed a selective transmission layer 100B and a reflection layer 102B. According to the embodiment shown in FIGS. 9 and 10, the area of contact between the pipe 16 and the heat-absorbing plate 50 or 52 can be made larger to improve heat conduction.

Figure 11:
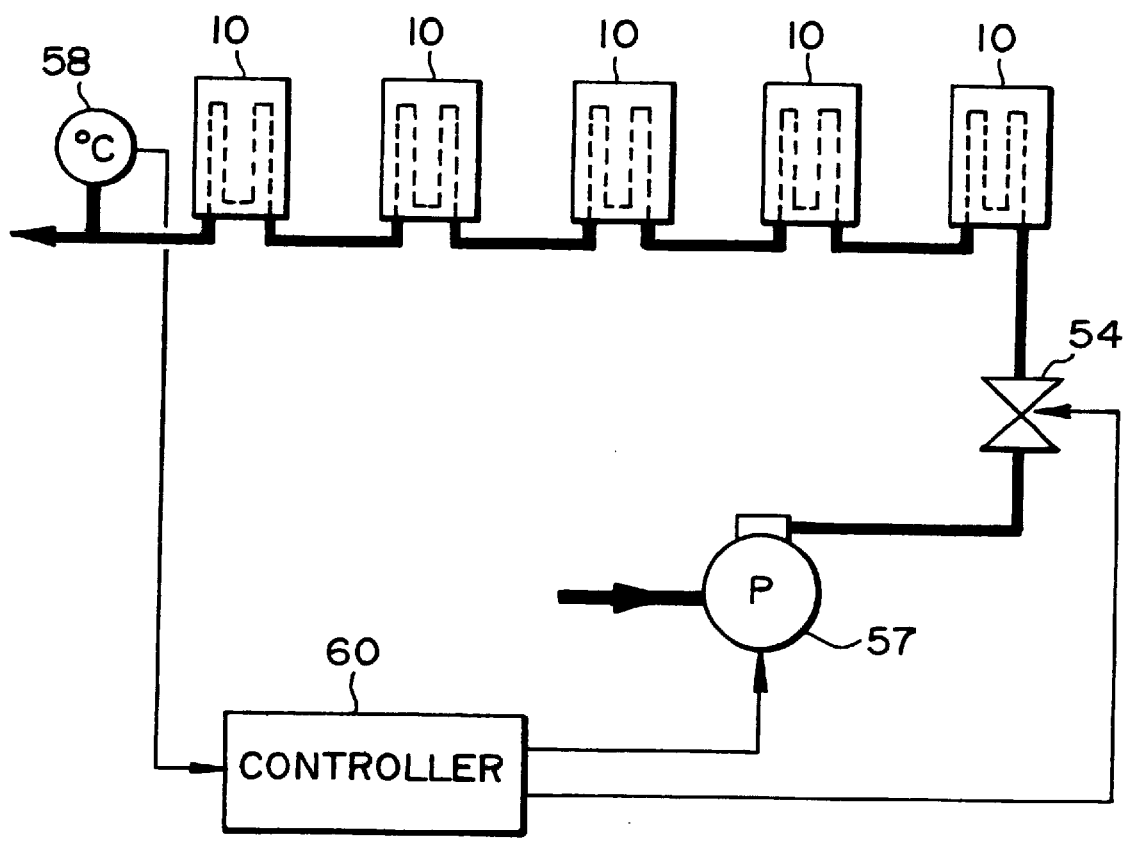
FIG. 11 is a diagram showing a system formed by connecting a plurality of solar heat collecting apparatuses in series.

FIG. 11 shows a general configuration of a system according to the present invention. This system includes a plurality of solar heat collecting apparatuses 10 connected in series. Each solar heat collecting apparatus 10 has a structure shown in FIGS. 1 and 2. Water is supplied by a pump 57 to the successive stages of the solar heat collecting apparatuses 10 through an electromagnetic valve 54 for flow control. The respective solar heat collecting apparatuses 10 transmit the solar heat to water, and therefore the water temperature rises as it passes through each solar heat collecting apparatus 10. A temperature sensor 58 is installed on the output side of the final solar heat collecting apparatus 10. A controller 60 controls the flow rate of water to keep the output temperature at a constant level according to a detected value of the temperature sensor 58. More specifically, the controller 60 controls the pump 57 or the electromagnetic valve 54 to adjust the flow rate of water flowing in the system. For example, even when the quantity of the solar radiation changes, if a flow rate is set which corresponds to receivable energy, the output temperature can be made constant. Even if the receivable energy is at a fixed level, when the input temperature of water supplied to the pump changes, the output temperature changes. Therefore, the flow rate may be adjusted according to changes in the input temperature.

In the system shown in FIG. 11, the capacity to reflect the infrared radiation from the heat-collecting member back to the heat-collecting member is higher in the apparatuses at the later stages where water at relatively high temperatures flows than in the apparatuses at the earlier stages where water at relatively low temperatures flows. In other words, the quantity of heat radiated from each heat-absorbing plate increases non-linearly as the temperature of the heat-absorbing plate rises, and therefore by varying the performance among the heat collecting apparatuses, a rational and economical system can be constructed. To cite an example, in a system having five apparatuses connected in series, only a selective transmission layer 100 and a reflection layer 102 are provided in each of the earlier two apparatuses, and a selective transmission film 104 and a reflection layer 106 are mounted together with the layers 100 and 102 in each of the later three apparatuses.

According to the above-described embodiments, a heat-absorbing plate is placed in a vacuum vessel, and the heat-absorbing plate and a plurality of columns are installed such that the heat-absorbing plate is not in contact with the columns, so that heat loss by thermal conduction can be reduced. Furthermore, the radiation of the infrared radiation from the heat-absorbing plate is suppressed, and the radiated infrared radiation are sent back to the heat-absorbing plate, with the result that the heat loss by heat radiation can be reduced. Therefore, the advantage of the present invention is that by raising the utilization ratio of energy, the water temperature can be elevated to higher temperatures than the conventional apparatuses. As the working medium, fluids other than water can be used.

What is claimed is:

1. A solar heat collecting apparatus comprising:
   a vacuum vessel;
   a heat-absorbing member for absorbing solar heat, arranged within the vacuum vessel so that it is separated from the walls of the vacuum vessel and so that its upper surface may be irradiated by solar radiation;
   a medium transport pipe, coupled to the heat-absorbing member, for transporting a medium to which the solar heat is transmitted from the heat-absorbing member;
   a lower surface layer, formed on the underside of the heat-absorbing member, for reflecting infrared radiation which would emerge from the heat-absorbing member; and
   at least one insulating film provided between the lower surface of said heat-absorbing member and the bottom surface of said vacuum vessel and in parallel with those surfaces, said at least one insulating film comprising a thin metal film.

2. A solar heat collecting apparatus according to claim 1, wherein said heat-absorbing member is formed of a metal material, and wherein said lower surface layer is formed by polishing the lower surface of said heat-absorbing member.

3. A solar heat collecting apparatus according to claim 1, wherein said lower surface layer is a metal film.

4. A solar heat collecting apparatus according to claim 1, wherein said lower surface layer is formed by attaching a heat-resistant base film having a metal film formed thereon to the lower surface of said heat-absorbing member.

5. A solar heat collecting apparatus according to claim 1, further comprising an upper surface layer formed on the upper surface of said heat-absorbing member and having a function of permitting said solar radiation to pass and reflecting the infrared radiation from said heat-absorbing member.

6. A solar heat collecting apparatus according to claim 1, further comprising a bottom surface layer formed on the bottom surface of said vacuum vessel and having a function of reflecting the infrared radiation emerging from the lower surface of said heat-absorbing member.

7. A solar heat collecting apparatus according to claim 1, wherein the upper wall is formed of a plurality of connected transparent curved segments, and wherein said upper wall is supported by a plurality of columns.

8. A solar heat collecting apparatus according to claim 1, further comprising:

a temperature sensor for measuring the temperature of said medium; and a controller for controlling the flow rate of said medium according to a detected value of said temperature sensor to maintain at a fixed level the temperature of the medium outputted from said solar heat collecting apparatus.

9. A solar heat collecting apparatus according to claim 1, wherein first and second holes are formed in said vacuum vessel, wherein heat-resistant and heat-insulating bushings for passing said medium-transport pipe therethrough are fitted in said first and second holes, and wherein a hermitic sealing process is performed between said holes and said bushings and between said bushings and said medium-transport pipe.

10. A solar heat collecting system comprising a plurality of solar heat collecting apparatuses connected in series, each said solar heat collecting apparatus including:

a vacuum vessel;

a heat-absorbing member for absorbing solar heat, arranged in said vacuum vessel and separated from the walls of said vacuum vessel and having an upper surface irradiated by solar radiation; and a medium transport pipe, coupled to said heat-absorbing member, for transporting a medium to which the solar heat is transmitted from said heat-absorbing member;

a lower surface layer, formed on the underside of the heat-absorbing member, for reflecting infrared radiation which would emerge from the heat-absorbing member; and at least one insulating film provided between the lower surface of said heat-absorbing member and the bottom surface of said vacuum vessel and in parallel with those surfaces, said at least one insulating film comprising a thin metal film, wherein said system is organized such that the capacity to reflect the infrared radiation emerging from said heat-absorbing member back to said heat-absorbing member is higher in the solar heat-collecting apparatuses of earlier stages than in the solar heat-collecting apparatuses of later stages.

11. A solar heat collecting apparatus comprising:

a vacuum vessel;

a heat-absorbing member for absorbing solar heat, arranged within the vacuum vessel so that it is separated from the walls of the vacuum vessel and so that its upper surface may be irradiated by solar radiation;

a medium transport pipe, coupled to the heat-absorbing member, for transporting a medium to which the solar heat is transmitted from the heat-absorbing member;

a lower surface layer, formed on the underside of the heat-absorbing member, for reflecting infrared radiation which would emerge from the heat-absorbing member; and a selective transmission film provided between the upper surface of said heat-absorbing member and the upper wall of said vacuum vessel and having a function of permitting said solar radiation to pass and reflecting the infrared radiation emerging from said heat-absorbing member.

12. A solar heat collecting apparatus comprising:

a vacuum vessel;

a heat-absorbing member for absorbing solar heat, arranged within the vacuum vessel so that it is separated from the walls of the vacuum vessel and so that its upper surface may be irradiated by solar radiation;

a medium transport pipe, coupled to the heat-absorbing member, for transporting a medium to which the solar heat is transmitted from the heat-absorbing member;

a lower surface layer, formed on the underside of the heat-absorbing member, for reflecting infrared radiation which would emerge from the heat-absorbing member; and a regulating member for guiding the infrared radiation moving round an end portion of said heat-absorbing member from the lower surface to the upper surface to said heat-absorbing member.

* * * * *